Figure 1:
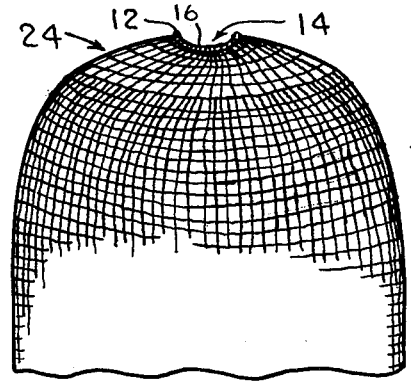

May 18, 1965 C. F. ZENS 3,184,236
BOWLING PIN REINFORCING COVER
Filed Oct. 19, 1962 3 Sheets-Sheet 1

INVENTOR.
CHARLES F. ZENS
BY
ATTORNEY

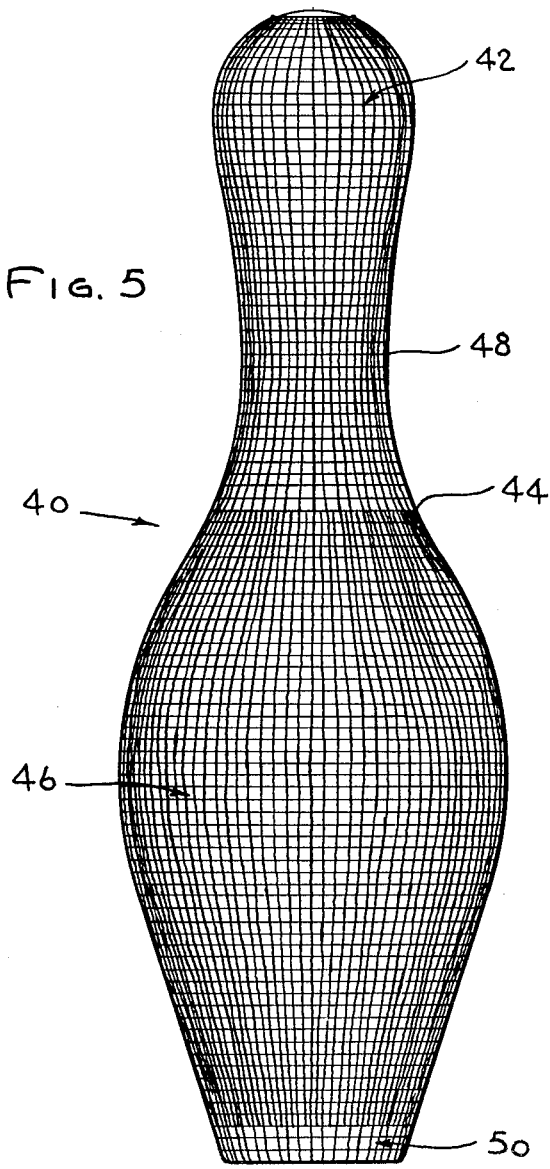

May 18, 1965     C. F. ZENS     3,184,236
BOWLING PIN REINFORCING COVER
Filed Oct. 19, 1962     3 Sheets-Sheet 3
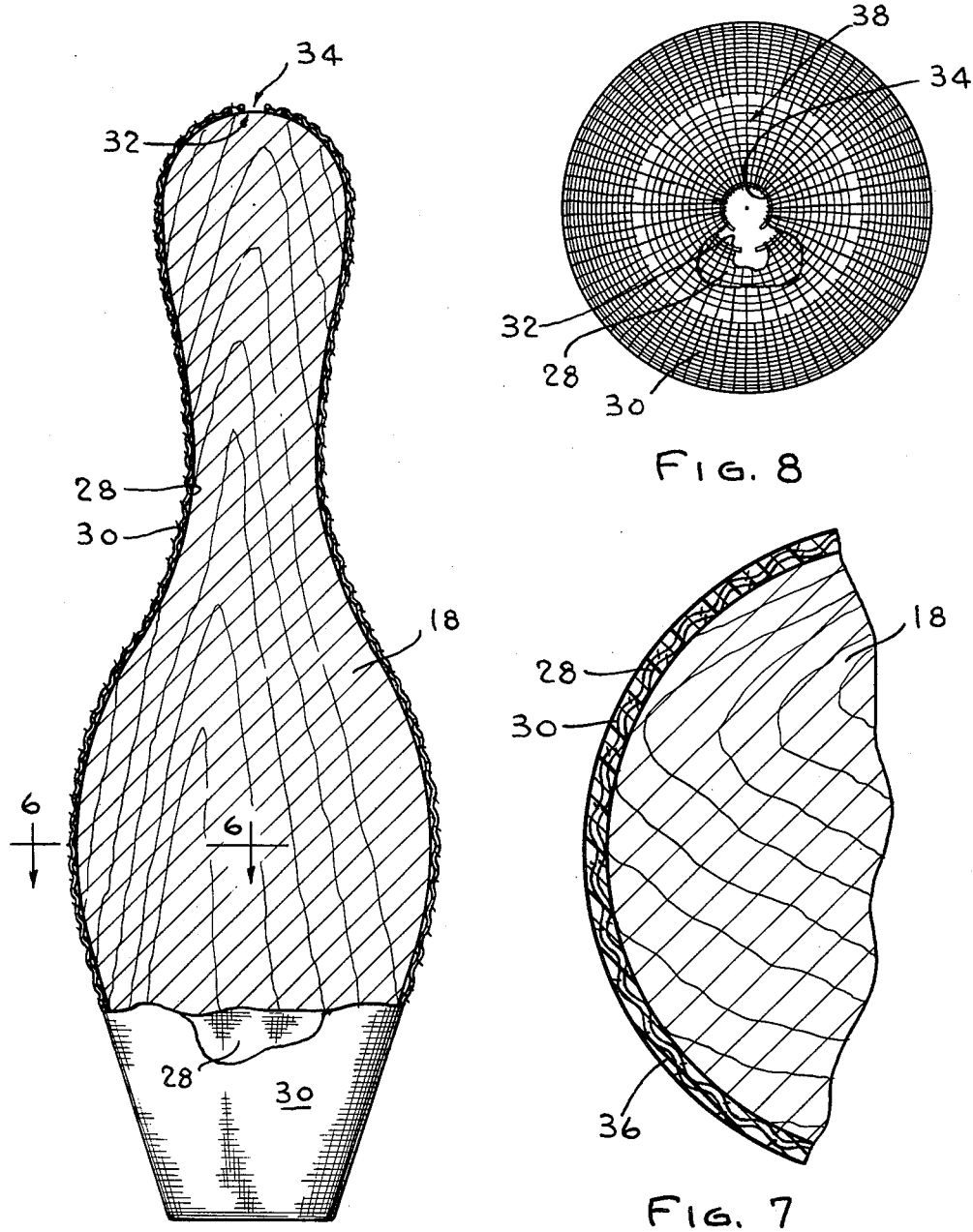
INVENTOR.
CHARLES F. ZENS
BY
ATTORNEY United States Patent Office 3,184,236
Patented May 18, 1965

3,184,236
BOWLING PIN REINFORCING COVER
Charles F. Zens, Milwaukee, Wis., assignor to Zens Hosiery Manufacturing Co., Milwaukee, Wis., a corporation of Wisconsin
Filed Oct. 19, 1962, Ser. No. 231,792
6 Claims. (Cl. 273—82)

This invention relates to the manufacture of bowling pins and, more particularly, to reinforcing covers of the type used in the manufacture of bowling pins.

In manufacturing bowling pins a wooden core is usually provided with a reinforced plastic coating, with the reinforcing most commonly being provided by a knit fabric cover fitted on the core. Such pin constructions have not been entirely satisfactory in that their useful life has been relatively short due to breakdown of the reinforced plastic coating. It has been observed that the breakdown of the coating occurs most frequently in the crown area of the pin which area is subjected to as much if not more punishment than the ball line area for the crown of the pin is the most frequently struck area when the pins are bowled over and bounce about the alley. Breakdown in the crown area is further aggravated with the use of automatic pin setters which are designed to grasp the crown portion of the pin subjecting it to repeated impact.

It has been discovered that with presently available reinforcing covers the undesirable breakdown in the crown area of the pins occurs as a result of voids produced by air and gases entrapped during the manufacturing process and also due to the formation of an imperfect and weak bond of the reinforcing plastic with the pin core. With presently available reinforcing covers the plastic cannot adequately penetrate the cover and as a result an uneven distribution of plastic occurs in the crown area producing a weak bond. Furthermore, air and other gases evolved during the manufacturing process are trapped in the crown area.

An object of this invention is to increase the useful life of a bowling pin.

Another object of this invention is to provide a reinforcing cover for use in the manufacture of a bowling pin which provides for an even distribution of plastic in the crown area, insures the formation of an adherent bond between plastic and core in the crown area and eliminates voids in that area due to entrapped air and gases.

A further object of this invention is to provide a reinforcing cover which will provide requisite reinforcing while providing for uniform and even distribution of plastic over substantially the entire pin periphery.

For the achievement of these and other objects this invention proposes a reinforcing cover for use in the manufacture of bowling pins which comprises a generally hollow elongated body adapted to fit over and conform to the pin core. One end of the body terminates in an aperture the size of which is preselected so that, when the cover is placed onto the core, the apertured end engages the crown area of the pin with the aperture exposing a portion of the crown. Air and gases which evolve during the manufacturing process escape through the aperture and a more uniform and complete distribution of plastic occurs at the pin crown for an improved bond. Moreover, this invention proposes to provide a cover having a fashioned area characterized by having a reduced number of wales as compared to the remainder of the cover. The fashioned area extends from the apertured end of the cover so that when the cover is placed on the pin core a more even distribution of plastic occurs in the crown area to produce a better bond. The length of the extension along the cover can be varied as desired so that fashioned area can be provided over the pin head, where the pin diameter is the smallest, with the area having the greater number of wales being provided over the pin body, or the ball line area, where the pin diameter is the greatest thereby providing for both optimum reinforcing and uniform plastic distribution.

In another aspect of this invention it is proposed to provide a bowling pin construction wherein a double reinforcing cover is provided. Two covers are drawn over the core, each having an end terminating in an aperture of predetermined size sufficient to expose a portion of the crown of the core when the covers are placed thereon.

Figure 2:
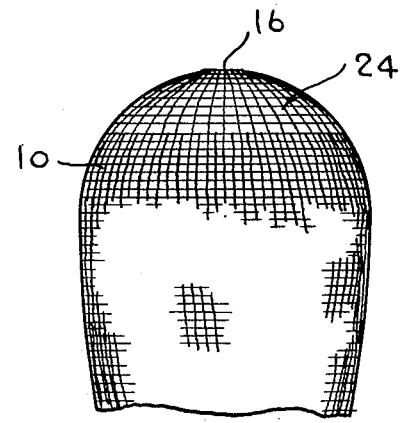
Figure 4:
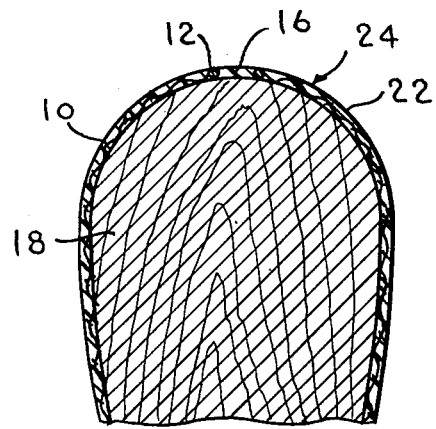
Figure 3:
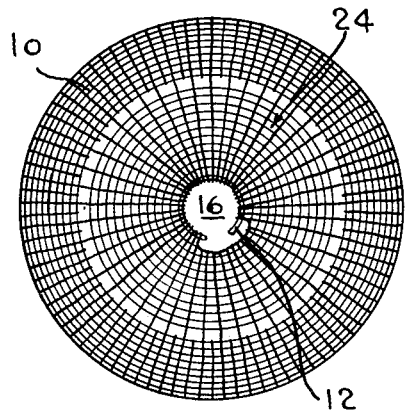

Other objects and advantages will be pointed out in, or be apparent from, the specification and claims, as will obvious modifications of the embodiments shown in the drawings, in which:

FIG. 1 is a side elevation of a reinforcing cover;
FIG. 2 is a partial section of a pin cover with a reinforcing cover thereon;
FIG. 3 is a plan view of the pin crown area;
FIG. 4 is a partial section of a pin core with a plastic reinforcing cover;
FIG. 5 is a side elevation of an alternative embodiment;
FIG. 6 is a partial section of an alternative arrangement;
FIG. 7 is a partial section of a pin core with a plastic reinforcing cover; and
FIG. 8 is a plan view of the pin crown area.

With particular reference to the drawings, a generally hollow elongated cover 10 is knit, or otherwise suitably formed, of synthetic or natural yarn. Preferably cover 10 is knit of nylon to take advantage of the particularly desirable elastic properties thereof. A draw string allows the open end 14 of the cover to be reduced to define an aperture 16 of a size such that, when the cover is fitted over a shaped wood core 18, the aperture will be positioned on the crown of the core, leaving a portion of the crown exposed. An elastic band 20 is provided at the opposite end of the cover to draw the cover into the contour of the lower portion of the core.

As can be seen in FIGS. 2, 3, and 4 when cover 10 is drawn over core 18 aperture 16 engages the uppermost part of the core leaving a portion of the crown thereof exposed. With the cover so positioned, the plastic making up coating 22 can make intimate contact with the core to form a uniform plastic coat adherently bonded to the core in the crown area. Moreover, the aperture allows for free passage of air and gases which are created and/or evolve during the manufacturing process so that the crown area is free of voids or similar points of weakness which results from entrapped gases. The margin of the cover forming aperture 16 also functions to hold the plastic in the crown area as the plastic dries preventing the plastic from running out of crown area thereby providing a plastic coat on the pin core which is of substantially uniform thickness throughout.

The size of aperture 16 can be varied as desired and will be dictated to a large extent by the viscosity of the plastic used. In practice and with presently available plastics, hole sizes from 1/8" to 3/4" have given satisfactory results.

It has also been discovered to be highly advantageous to provide the cover with what in the knitting art is referred to as a fashined top or area 24. This is preferably provided by reducing the number of needles used to knit area 24, as compared to the number used to knit the remainder of the cover, and doing so in such a manner that alternate wales are omitted or removed from area 24, this will be apparent from the generally schematic illustration of FIG. 3. With such an arrangement area 24 is in a sense more loosely knit than the remainder of the cover, and open areas 26 are defined in fashioned area 24 by the removal of alternate wales which are larger than area 25 defined in the remainder of the cover. These larger open areas, in addition to allowing more complete and uniform distribution of plastic, also function to hold the plastic in the crown area preventing it from running off thereby insuring a plastic coat of desired thickness in the crown area.

The fashioned area extends from aperture 16 and can be terminated at any point along the cover as desired to provide a cover having a fashioned area which will cover a preselected portion of the pin core. In the embodiment illustrated in FIGS. 1–4 the fashioned area is limited to the area immediately adjacent aperture 16 for the reasons stated above. However, with the fashioned area, the knit fabric can be distributed throughout the cover so that when the cover is drawn over the core the number of wales in the cover can be varied for optimum reinforcing strength and to provide a uniform and adherent bond over the entire periphery of the pin core. More particularly and with reference to FIG. 5, a cover 40 is knit with a reduced number of needles, preferably so as to eliminate alternate wales, throughout an area 42 thereof. At a predetermined point 44, the number of needles used is increased, in this instance doubled, to knit the body on ball line area 46. Point 44 is selected as the point at which the core neck area 48 is expanded to approximately the maximum diameter of the core head so that when the cover is drawn over the core the fashioned area 42, with alternate wales removed, covers the core head and neck area and area 46, with double the number of wales, covers the ball line area of the core.

In common bowling pin constructions the maximum diameter in the ball line area is approximately double that of the maximum diameter in the head area. Accordingly by doubling the number of wales in the ball line area as compared to head and neck area, the number of wales varies substantially in proportion to the diameter of the pin. With this arrangement a larger number of wales is provided in the larger diameter ball line area with a lesser number being provided in the smaller diameter pin head area. Thus adequate reinforcing strength is provided in both the ball line and head areas and the accumulation of excess fabric in the head and neck area is provided thereby insuring uniform distribution of plastics in the head area and an adherent bond with the covers in that area.

In order to avoid the accumulation of excess fabrics at the base of the pin where the core diameter narrows, it may be desirable to knit this portion of the cover with a reduced number of needles to provide an area 50 having a reduced number of wales.

In the manufacture of bowling pins the shaped core 10 is usually pretreated with a primer or sealer coat. A base coat is applied, to which is added a coating of suitable plastic applied by dipping the core, or in any other suitable manner. The reinforcing cover is then drawn over the core and the core is subjected to a wash coat consisting of a high percentage of thinner and a low percentage of plastic. The wash coat softens the plastic and allows the cover to pull tight onto the core producing a pin structure wherein a reinforcing cover is embedded in a plastic coating 22. As the plastic dries, air and other gases, which rise in the plastic, are allowed to escape through aperture 16 so that the plastic is evenly distributed through the crown area and forms an adherent and uniform bond at the crown of the core which is not weakened by the presence of voids formed by entrapped air and gases.

The overall strength of the resultant bowling pin can be further enhanced by using a double cover construction which comprises two reinforcing covers 28 and 30 drawn one over the other and over the core. Both covers include an aperture 32 and 34 formed in a knit cover by a draw string or other suitable arrangement. Where two covers are utilized, after inner cover 28 is applied to the core in accordance with the steps outlined above, a second plastic coating is applied and outer cover 30 drawn over the core. The wash coat, as described above, is then applied to allow the cover 30 to pull tightly into the core, in this instance resulting in a plastic coat 36 having two reinforcing covers embedded therein. Again apertures 32 and 34 provide for more complete penetration and thorough distribution of plastic at the crown of the core of a more tenacious and uniform bond and also to allow for escape of air and gases eliminating any voids which would otherwise occur in the plastic at the crown of the pin.

As can be seen in FIGS. 7 and 8 inner aperture 32 is larger than outer aperture 34 and the outer aperture lies within the inner. With this arrangement the inner cover provides for a larger unobstructed bonding area to the core crown and the outer cover provides for reinforcing at least a portion of the plastic coat in the crown area.

As illustrated in FIG. 8, one of the covers, outer cover 30, can be provided with a fashioned area 38 such as that described above in relation to cover 10, however, it will be appreciated that neither or both of the covers can be provided with such fashioned areas and that the length of the fashioned areas, where used, can vary as previously discussed in relation to the embodiment of claim 6.

When completed the difference in thickness of the two cover construction as compared to the single cover construction is practically negligible. This results from the fact that as the outer and inner covers draw into the core the wales of one become offset from the other (see FIG. 7) forming an interlocking arrangement and occupying only slightly more area than a single cover. Thus the advantages of the added strength of two covers is had but not at the expense of unduly increasing pin size.

In accordance with this invention a reinforcing cover is provided for use in the manufacture of bowling pins which provide for a more uniform and complete distribution of plastic in the crown area to result in a plastic coat which is free of voids and securely bonded to the pin core and pins constructed with this reinforcing cover have exhibited a markedly longer useful life.

Although the present invention has been illustrated and described in connection with particular embodiments thereof, it will be apparent to those skilled in the art that various changes and modifications may be made therein without departing from the spirit of the invention or from the scope of the appended claims.

What I claim is:

1. A bowling pin reinforcing cover for use in the manufacture of plastic coated bowling pins comprising:
    a knit fabric hollow elongated member having a crown portion and a body portion, said crown portion terminating in an open end to define an aperture which is relatively small in diameter in relation to the diameter of said body portion and which is adapted to engage the top of the crown of a bowling pin leaving exposed a small portion of said crown, the cover terminating in its entirety at said aperture whereby there is no projection of the cover beyond said aperture, said aperture being of a size (a) to permit air and gases which evolve during the manufacturing process to escape and insure a crown area free of voids and (b) to hold the plastic in the crown area during drying and thus insure a uniform thickness; and
    said body portion having a substantially greater amount of yarn per unit area than said crown portion and being so positioned as to cover the ball line of the bowling pin.

2. A bowling pin reinforcing cover for use in the manufacture of plastic coated bowling pins comprising:
    a knit fabric hollow elongated member having a crown portion and a body portion, said crown portion terminating in an open end to define an aperture which is relatively small in diameter in relation to the diameter of said body portion and which is adapted to engage the top of the crown of a bowling pin leaving exposed a small portion of said crown, the cover terminating in its entirety at said aperture whereby there is no projection of the cover beyond said aperture, said aperture being of a diameter generally in the range between ⅛″ and ¾″ (a) to permit air and gases which evolve during the manufacturing process to escape and insure a crown area free of voids and (b) to hold the plastic in the crown area during drying and thus insure a uniform thickness.

3. A bowling pin reinforcing cover for use in the manufacture of plastic coated bowling pins comprising:
a knit fabric hollow elongated member having a crown portion convexly converging towards one end of said member and a generally tubular body portion located at one of its ends adjacent to said crown portion and extending axially towards the other end of said member;
said crown portion having substantially less yarn per unit of area than said body portion; and
said body portion having substantially more yarn per unit area than said crown portion and being so positioned as to cover the ball line of the bowling pin.

4. A bowling pin cover as claimed in claim 1 wherein the diameter of said aperture is generally in the range between ⅛″ and ¾″.

5. The reinforcing cover of claim 1 wherein said crown portion has a reduced number of wales as compared to said body portion.

6. The reinforcing cover of claim 5 wherein the end of said cover opposite the apertured end is characterized by having a reduced number of wales.

References Cited by the Examiner
UNITED STATES PATENTS

| | | |
|---|---|---|
| 146,446 | 1/74 | Gernshym. |
| 147,385 | 2/74 | Gernshym. |
| 761,592 | 5/04 | Lippet. |
| 1,517,859 | 12/24 | O'Shea. |
| 1,749,776 | 3/30 | O'Lena. |
| 2,484,293 | 10/49 | Hinchliff _____ 66—170 |
| 2,506,745 | 5/50 | Schuessler _____ 66—171 |
| 2,535,033 | 12/50 | Bergere _____ 273—82 |
| 2,610,057 | 9/52 | Hunt _____ 273—82 |
| 2,711,168 | 6/55 | Brickman et al. |
| 2,960,984 | 11/60 | Parker _____ 128—91 |
| 3,025,062 | 3/62 | Duffin _____ 273—82 |

RICHARD C. PINKHAM, *Primary Examiner.*

DELBERT B. LOWE, *Examiner.*